UNITED STATES PATENT OFFICE 2,633,794

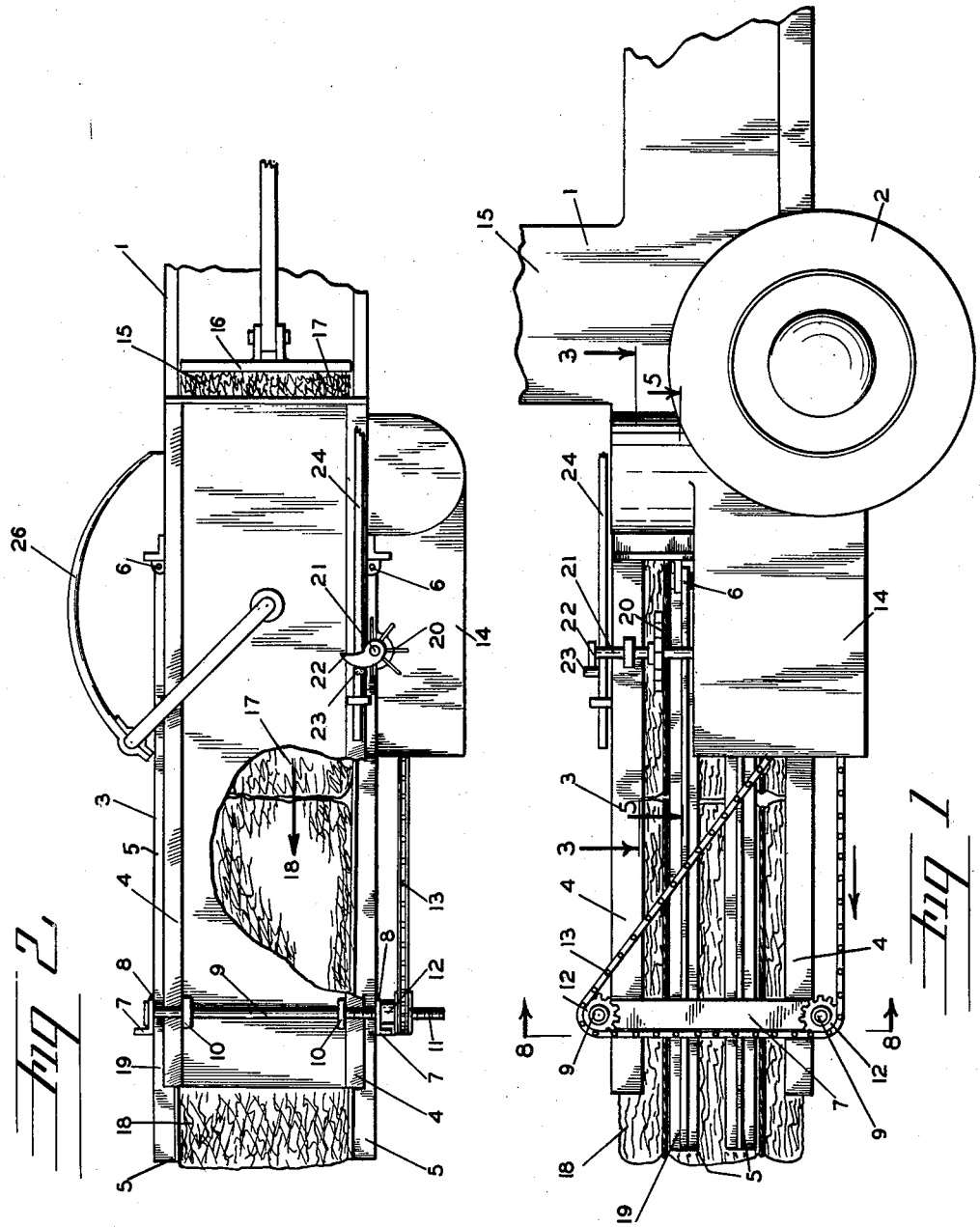

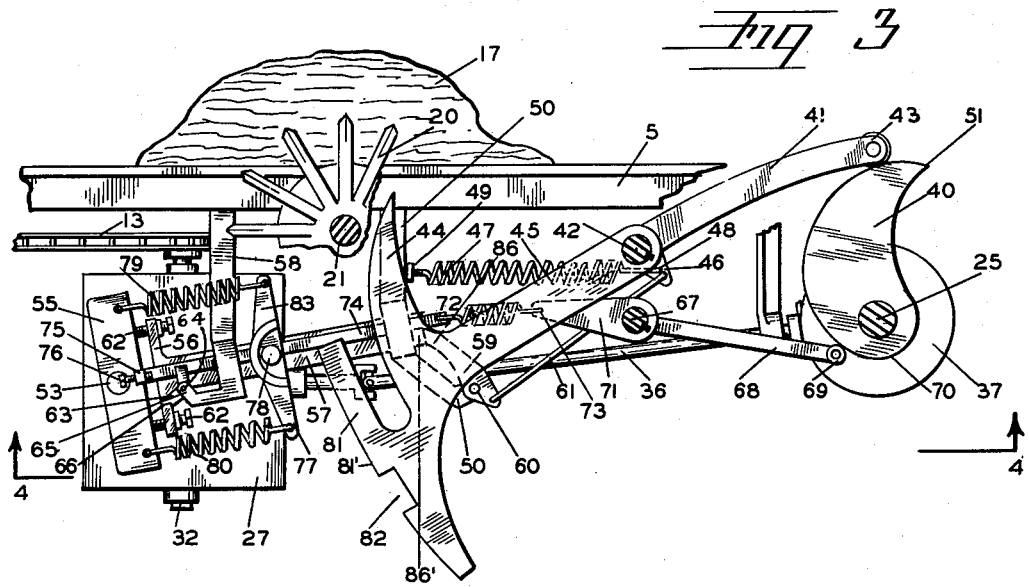
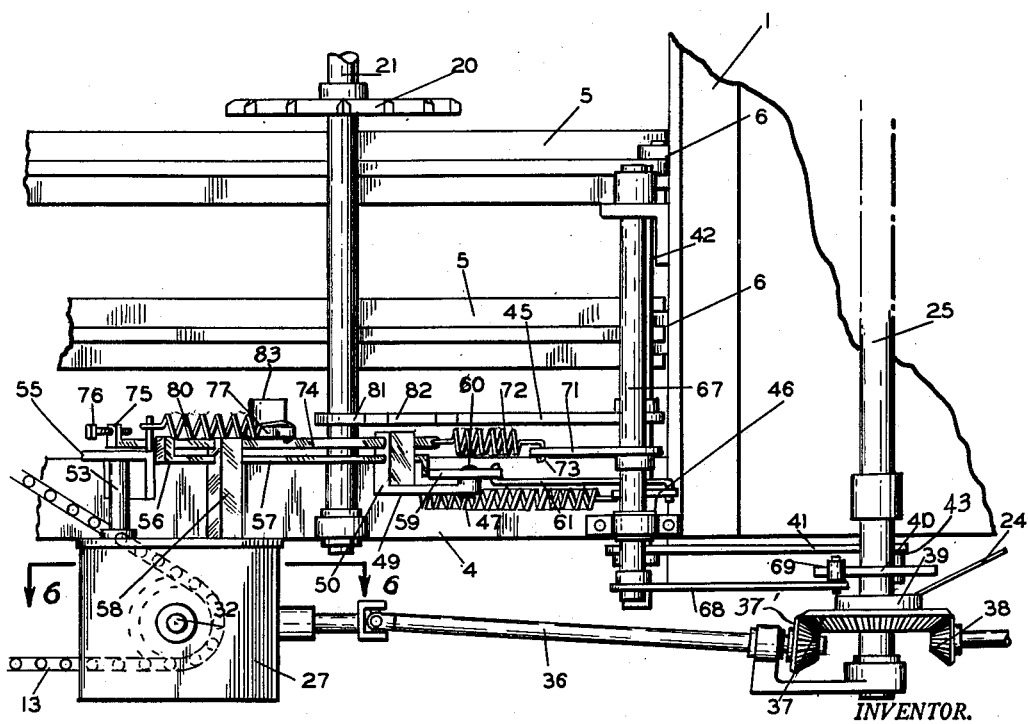

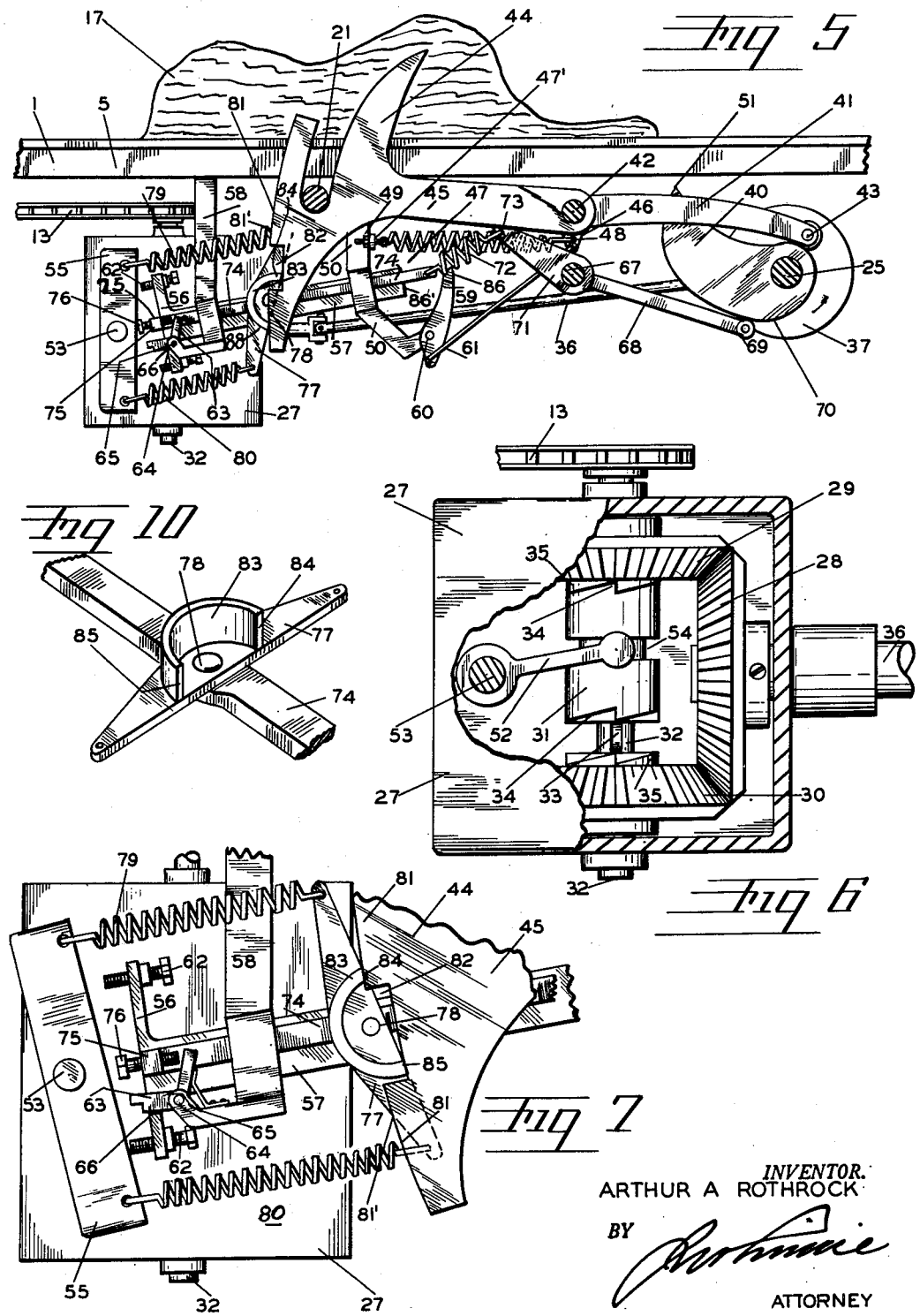

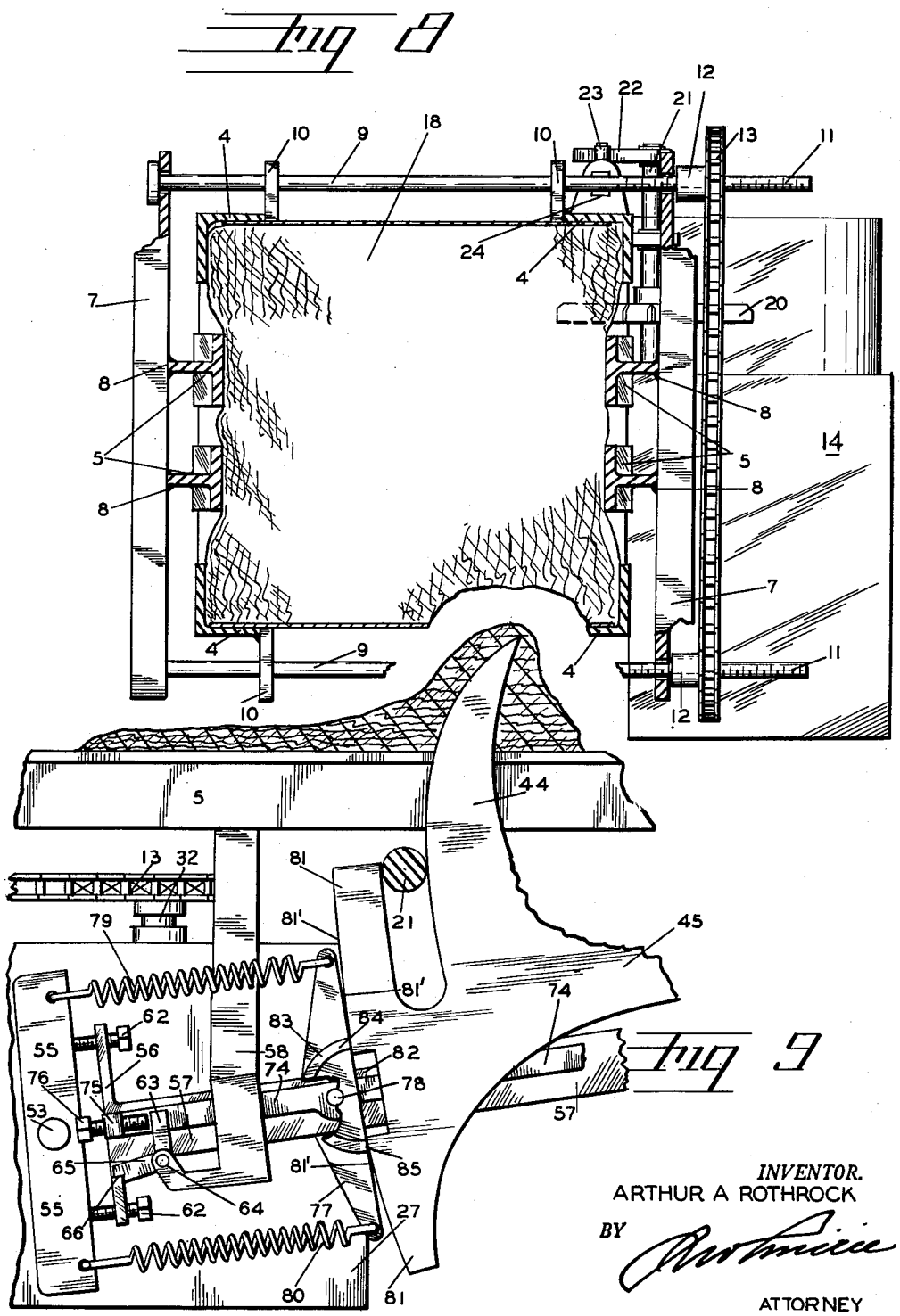

HAY BALER

Arthur A. Rothrock, Portland, Oreg., assignor to J. A. Freeman & Son, Portland, Oreg.

Application February 26, 1948, Serial No. 11,130

3 Claims. (Cl. 100—4)

This invention relates to hay balers and is particularly adapted to be used in connection with pick up balers. The pick up baler is a hay baler that picks up the hay from windrows, bales the same into bales while the machine is travelling over the ground and discharges same.

The primary object of the invention is to automatically control the density of the hay being formed into bales. When hay is being baled, the hay located on high places is usually drier than hay from the lower places, and heretofore an attendant had to be seated on the baler to pay particular attention to adjusting the density of the hay being baled. This was not satisfactory as it could not accurately be accomplished, but with my new and improved automatic control greater accuracy is attained, thereby providing an equally balanced bale as well as eliminating the breaking of the binding twine.

My invention is adapted to various makes of balers, although my drawings are shown adapted to a baler whose trade name is the Holland, whose patent number is believed to be 2,236,628 issued to Edwin B. Nolt on April 1, 1941.

The general principle of my invention is to provide an automatic means of adjusting the resistance offered to the discharge of the bale from the rear of the baling chamber, causing the plunger to pack the hay to the proper density within the bale.

These and other incidental objects will be apparent in the drawings, specification and claims.

Referring to the drawings:

Figure 1 is a fragmentary side view of a pick up baling press having my new and improved automatic bale tension control mounted thereon.

Figure 2 is a plan view of Figure 1.

Figure 3 is an enlarged fragmentary plan detail of my automatic bale tension control in inoperative position.

Figure 4 is an enlarged fragmentary side view of Figure 3.

Figure 5 is the same as that of Figure 3 except that the control is shown in the position for increasing the bale density by increasing the tension or pressure against the movement of the bale.

Figure 6 is a detail fragmentary sectional view of the reverse gear box for controlling the increasing or decreasing of the tension mechanism of the baling or compression chamber relative to the bale.

Figure 7 is an enlarged view of the automatic gear shifting device for the reverse gear illustrated in Figure 6, the same in the opposite position to that shown in Figure 5.

Figure 8 is a rear view in section of the bale compression chamber particularly illustrating the tension bars for controlling the density of the bale, the same having my new and improved tension control mounted thereon. This view is taken on line 8—8 of Figure 1.

Figure 9 illustrates the automatic reverse gear shift control in a position where the density of the bale is correct and no adjustment is to be made.

Figure 10 is a perspective fragmentary view of the rocker arm and the quadrant engaging member mounted to the operating rod.

Referring more specifically to the drawings:

The hay baler in general is indicated by numeral 1 mounted upon wheels 2, the bale compressor chamber extending rearwardly at 3. Referring to Figures 1, 2 and 8, the bale compression chamber consists of longitudinal rails 4 which are fixedly mounted to the baler 1 and forms a rigid part thereof. Longitudinally disposed between the rails 4 are tension bars 5. These bars are pivotally mounted vertically to the bale compression chamber at 6 at their forward ends to swing horizontally in and out and fixedly secured to the vertical bars 7 at their rear ends, as for instance by welding to the said bars at 8.

The vertical bars 7 and attached tension bars 5, are supported by the cross rods 9, which are slidably mounted within the bearing members 10 forming part of the rails 4. The cross rods 9 are threaded at 11 and have sprockets 12 threadably mounted thereon. This is where my invention begins. Heretofore hand cranks, or other means, were threaded to the cross rods 9, but with my invention these hand operated tighteners are replaced with the sprockets 12 which in turn are driven by the drive chain 13 from my new and improved control mechanism which is housed within the casing 14 and which will be more fully described in detail later on.

I will now describe the operation of the conventional baler, the hay is fed into the hopper 15 and is compressed within the bale compression chamber 3 by the plunger 16. The mechanism for operating the plunger and other parts of the baler have been eliminated in my drawings. As the plunger packs the hay 17 within the bale compression chamber 3 it pushes the bound bale 18 out through the discharge end 19 of the said chamber. At the same time the hay 17 is being tied by baling wire or twine.

Explaining briefly how the bale tying mechanism is set in motion, a toothed wheel 20 is fixedly mounted to the vertical shaft 21 to extend into the baling chamber 3 as seen in Fig. 8 and engages the hay 17 being packed and moved in the direction of the arrow. When the hay 17 has travelled past the tooth wheel 20 a predetermined distance revolving the wheel 20 and the cam 22 one revolution, the cam engages the stop 23 associated with the control rod 24 operating the same by pushing said rod rearwardly. This causes the bale tying mechanism mounted to the shaft 25 to go into operation including the threading needles 26, tying the bale as it passes through the bale compression chamber 3. The bale tying mechanism is of well known construction as in Patent No. 2,236,628 or otherwise, and I have omitted showing the same except only as it is related to my invention in regards to operating my new and improved automatic hay baler density control mechanism. Therefore, I merely show the shaft 25, which is directly connected to my control and I have shifted one or more of the parts in regards to the shaft to more clearly carry out the objects of my invention.

My invention further consists of driving the chain 13 in either direction, depending upon whether the bale density is to be increased or decreased. This chain is driven through the reversing gear box 27 (Fig. 6). This gear box consists of a driving pinion 28 and two driven pinions 29 and 30. A jaw clutch 31 is slidably mounted on the driven shaft 32 being splined to the shaft 32 by the key 33 and is adapted to have its jaws 34 shifted into engagement with the jaws 35 of either of the driven pinions 29 and 30.

The driving pinion 28 is keyed to the shaft 36, which in turn is driven constantly by the gear 37 and pinion 37'. The gear 37 forms part of the tying assembly mounted to the shaft 25 and is driven by a drive pinion 38 from the baling machine. The gear 37 is driven continuously and has a clutch assembly 39 which is thrown in and out by the control rod 24, the interconnections of which I have eliminated as this is standard practice. As the control rod 24 is operated by the cam 22, as above described, by the wheel 20 engaging the hay 17 on its way through the baler, it sets up the cycle of operating for tying or binding the bale of hay through the needles 26 and the tying mechanism not here shown in detail. As the tying unit operates tying the bale the shaft 25 is being rotated.

I will now describe how the density of the hay is determined by my invention. Referring with Figures 3, 4 and 5, to my invention I add the cam 40 to the shaft 25, which cam operates the arm or lever 41 which is fixedly secured to the vertical shaft 42. When the toothed wheel 20 revolves the cam 22 operating the control rod 24, throwing in the clutch 39 causing the shaft 25 and the cam 40 to travel in the direction of the arrow, the roller end 43 of the arm or lever 41 will drop to the position shown in Figure 5 from the position shown in Figure 3.

An arm 45 is also fixed or keyed to the shaft 42 and carries a point or wedge 44, the object of which will be later described. A crank arm or lever 46 is also fixedly secured to the vertical shaft 42 and has one end of the spring 47 hooked therein at 48. The opposite end of the spring is anchored at 49 to the framework 50 of the machine by way of the adjustable screw 47'. The spring tends to force the wedge 44 into the hay 17, when the end 43 of the arm 41 is released from the point 51 of the cam 40. In the event the density of the hay is relatively loose the point 51 will allow the arm 45 to take the position shown in Figure 5.

Referring now to Figure 6, I will describe the mechanism for shifting the jaw clutch 31 to either of the pinions 29 or 30. A yoke 52 is fixedly secured to the vertical shaft 53. The end of the yoke engages the annular groove 54 of the clutch in the usual manner. In Figures 3, 4 and 9 the position of the clutch 31, including the shaft 53, is in neutral, the chain 13 remaining at a standstill while the shaft 36 is revolving.

Referring to Figure 3, the end 43 of the arm 41 is in the neutral position, being held there by the cam 40. This is also true of the header or tying unit not here shown. When this is the condition the clutch 31 is being held in neutral position by the yoke 52 which is fixed or keyed to the vertical shaft 53 of the clutch assembly. The yoke 52 is held in this position by the cross head 56 which engages the T lever or bar 55 which is keyed to the shaft 53. The cross head 56 forms part of the sliding bar 57 which slides within the framework or bracket 58 of the machine. This bar 57 is held in the neutral position as indicated in Figures 3 and 9 by the action of the lever 59, which is pivotally mounted to the framework 50 at 60 and is connected to the crank arm 46 by way of the connecting link 61.

The set screws 62 through the ends of cross head 56 bear against the lever 55 holding the same in a mid-way or neutral position disengaging the jaw clutch 31 from the pinions 29 and 30. The bar 57 is definitely locked in this position, shown in Figures 3, 4 and 9, by the bell crank latch 63 which is pivotally mounted to the frame 58 at 64, its end 65 engaging the cross head 56 at a raised stop shoulder 66, thereby positively locking the bar in neutral. It is not desirable to operate the cross head 56 and the clutch 31 until after the wedge 44 has entered the hay and has come to rest, then it is desirable and necessary to trip the bell crank 63 releasing the cross head 56 which allows the bar 57 to move towards the right as viewed in the drawings.

I will now describe how the bell crank 63 is released. A vertical shaft 67 is mounted to the framework of the machine and has a crank arm 68 fixedly secured thereto, its outer roller end 69 engaging the edge surface 70 of the cam 40. A crank arm 71 is also fixedly secured to the shaft 67, and has a spring 72 connected thereto at 73 at its one end, and to the sliding rod 74 at its opposite end.

Referring to Figure 5, the surface 70 of the cam 40 has just engaged the end 69 of the arm 68 revolving the shaft 67, rotating the arm 71, pulling the spring 72 and rod 74 to the right together with its end 75, causing the set screw 76 to engage and move the bell crank latch 63 unlocking its end 65 from the cross head 56 at stop shoulder 66. This allows the cross head 56 and bar 57 to move to the right when the following action takes place. A rocker arm 77 is pivotally mounted to the rod 74 by the pin 78, best illustrated in Figure 10. Springs 79 and 80 connect the T lever 55 and the rocker arm 77 together, these springs being of equal strength maintain the said T lever and rocker arm parallel to one another when the hay is of the proper density as illustrated in Figures 3, 4 and 9.

I will now describe the operation of my bale density control when the density of the bale is too loose. Referring to Figure 5, the point or wedge 44 has travelled into the hay a distance which would indicate that the density of the hay was very loose. The arm 45 has a quadrant 81 with a cut out portion 82 located therein. Referring to Figure 10 it will be noted that a quadrant engaging member 83 forms part of the rocker arm 77 and extends upwardly therefrom. This member 83 is adapted to engage the quadrant 81 of the arm 45 when the surface 70 of the operating cam 40 operates the arm 68 and the arm 71 pulling the rod 74 to the right.

This position is particularly illustrated in Figure 9, but as the wedge 44 enters the hay as illustrated in Figure 5 the full distance, the end edge 84 of the quadrant engaging member 83 drops into the cut out portion 82 of the quadrant 81. This allows the rod 74 to be pulled still further to the right by the cam 40, lever 68, crank 71 and spring 72. When this happens the rocker arm 77 revolves clockwise as viewed in the drawing due to the fact that the edge 85 of the member 83 is still riding on the surface 81' of the quadrant 81, putting greater tension on the spring 79 than on the spring 80.

When the rod 74 moved from the position shown in Figure 9 to that shown in Figure 5 the set screw 76 located in the end 75 of the rod 74 engaged the bell crank 63 disengaging its end 65 from the stop 66 of the cross head 56. This allowed the sliding bar 57 to move to the right increasing the tension of the spring 79. The increased tension on the said spring 79 revolves the T-bar or lever 55, shaft 53 of the reversing gear assembly in gear box 27 swinging the yoke 52 and moving the jaws 34 of the sliding clutch 31 into engagement with the jaws 35 of the pinion 30. This will revolve the shaft 32 from the drive shaft 36 in a direction to drive the chain 13 in the direction of the arrow, rotating the sprockets 12 on the thread 11 of the cross rods 9 moving the tension bars 5 towards one another creating a greater resistance to the movement of the bale 18, thereby causing the plunger 16 to pack the hay 17 into a more densely formed bale (Fig. 2).

Due to the fact that the cam 40 is revolved but one revolution in each cycle of binding the bale the power applied to the chain 13 is but momentarily as when the high point 51 of the cam clears the end 69 of the lever 68 the spring 72 will release the rod 74 allowing the tension of the springs 79 and 80 to pull the rod 74 to the left disengaging the quadrant engaging member 83 from the notch 82 of the quadrant. This permits the arm 45 to return to its starting position as indicated in Figure 3 when the cam surface 70 of the cam 40 continues to revolve moving the lever 41 to the position as indicated in Figure 3.

When the lever 41 was moved to the above said position it rotated the shaft 42 and the crank arm 46, pulling the link 61 rocking the lever 59 about its pivot 60 engaging its outer end 86 with the end 86' of the sliding bar 57 forcing the cross head 56 and the set screws 62 against the T-bar 55 centering the same to the position indicated in Figure 3 disengaging the sliding clutch 31 from the driven pinions 29 and 30 stopping the movement of the chain 13 and the compression of the tension bars 5 against the bale 18. When the sliding bar 57 was pushed toward the T-bar 55 the bell crank 63 engaged the stop 66 holding the said bar 57 and cross head 56 against the T-bar 55 maintaining the clutch 31 in neutral.

I have just completed a cycle of operation for increasing the density of the bale of hay. I will now describe briefly the operation of my control for decreasing the density of the bale. Referring to Figure 7, when the tying mechanism of the baler is operated and the density of the hay 17 is too dense the wedge 44 will not enter the hay 17 a sufficient distance when the arm 45 is released by the cam 40 to bring the notch 82 of the quadrant 81 in line with the member 83 as illustrated in Figure 7. When the edge 85 of the member 83 is pulled into the notch 82 by the rod 74 the edge 84 will rock the rocker bar to the position shown in Figure 7. This will then put a greater tension on the spring 80 causing the bar 55 to engage the sliding clutch 31 with the pinion 29. The pinion 29 will drive the chain 13 in the opposite direction of the arrow which will back off the sprockets 12 on the threads 11 of the cross rods 9 permitting the tension bars 5 to separate from each other loosening the tension on the bale 18 permitting the same to move more freely through the bale compression chamber, therefore the plunger 16 (Fig. 2) will not pack the hay 17 as densely, thereby permitting the bale to be tied with less density.

In the event the hay 17 is of the proper density the wedge 44 will be permitted to penetrate into the hay as illustrated in Figure 9 a distance where the notch 82 of the quadrant 81 registers with the center line of the member 83. In this event when the cam arm 68 is operated by the rotation by the cam 40 it will be impossible for the arm 71 and the spring 72 to pull the rod 74 to the right as the edges 84 and 85 of the member 83 will engage the surface 81' of the quadrant 81 as illustrated in Figure 9, therefore neither the sliding bar 57 nor the rod 74 will be moved and the tension on both of the springs 79 and 80 will be equal so that the sliding clutch 31 will not be moved into engagement with either of the pinions 29 or 30, therefore the chain 13 will remain at rest together with the adjustment of the tension bars 5.

When the member 83 bridges the notch 82 of the quadrant 81 the set screw 76 at the end 75 of the rod 74 will not be permitted to trip the locking bell crank 63 from the cross head 56 permitting the said cross head to hold the T-bar 55 and clutch 31 in neutral.

From the above description it will be readily understood that on each cycle of the binding of the bale of hay the cam 40 will be revolved one revolution, first permitting the wedge or point 44 carried by the arm 45 to be forced into the hay by the spring 47. The distance that it enters the hay will determine whether the member 83 will remain on the surface 81' of the quadrant 81, or will have one of its edges 84 or 85 drop into the notch 82 of the said quadrant unlocking the cross head 56 and permitting the tension to be varied on the springs 79 and 80 shifting the T-bar 55 in either direction throwing the clutch 31 into either of the pinions 29 or 30, depending upon the distance that the wedge or point 44 enters the hay.

As the wedge or point 44 enters the hay its full distance, then the tension bars 5 will be brought closer together providing a greater resistance to the movement of the hay through the bale compression chamber, or if the wedge 44 is not permitted to enter the hay any great distance then the tension bars 5 will be caused to release their tension against the bale of hay causing a looser baling operation. This is the primary object of my invention and this idea can be applied to any automatic type of hay baler requiring a few slight mechanical changes to adapt the same to the various balers.

What I claim as new is:

1. In an automatic pick-up baling machine, including a baling chamber, means for pressing material in said chamber and moving the pressed material through said chamber, means for altering the transverse area of said chamber to vary the density of the pressed material, means intermittently actuated by the movement of the pressed material through said chamber for automatically tying said pressed material in said chamber into bales, means for operating the tying means from the movement of the pressed material in said chamber, a horizontal toothed wheel mounted adjacent and projecting into said chamber to be rotated by the movement of said material, a cam movable with the wheel, a rod having a stop actuated by the cam to periodically operate said tying means, and a cam operated lever means actuated from said toothed wheel and tying operating means for automatically controlling the operation of periodically adjusting said area altering means in accordance with the density of said pressed material in said chamber when too loose or too dense and rendering the same inoperative when the density is normal.

2. In an automatic baling machine having a baling chamber, means for pressing material in said chamber and moving pressed material through said chamber, means for altering the transverse area of said chamber to vary the density of the pressed material, including vertical bars arranged at the sides of the chamber, horizontal tension bars fixed to the vertical bars and swingable in and out from their forward ends, rotatable means for drawing said bars together or separating them, means for automatically tying said pressed material in said chamber into bales, means actuated by the movement of the pressed material in said chamber to cause actuation of the tying means, means for operatively connecting said rotatable means with the tying actuating means, cam and lever actuated means operated from the automatic tying means to penetrate the pressed material, the degree of penetration depending upon the density of said pressed material, and releasable means for holding said penetrating means against movement when the density is normal and to release same when the density is above or below normal to reverse the operation of the rotatable means for actuating said bars.

3. In an automatic baling including a baling chamber, means for pressing material in said chamber and moving the pressed material through said chamber, means for altering the transverse area of said chamber to vary the density of the pressed material including horizontal shafts, vertical bars connected by said shafts and movable thereon toward and away from each other, spaced horizontal tension bars rigidly connected to the vertical bars and pivoted to the sides of the chamber at their forward ends to move in and out, rotatable means on the shafts to move said bars in and out, reversible drive means for said rotatable means, means for automatically tying said pressed material in said chamber into bales and driven from the baling machine, means actuated by the movement of the pressed material to cause intermittent actuation of the tying means, said reversible drive means being driven from the drive means of the tying means, cam actuated levers mounted horizontally at one side of the chamber and including a pointed wedge for penetrating the material in the chamber, means tending to hold said wedge in a penetrating position, adjustably resilient means preventing movement of said wedge to penetrate the material when the density thereof is normal, and said reversible drive means causing said wedge to be actuated in reverse directions when the density is above or below normal, to cause reverse actuation of the rotatable bar operating means to draw the bars together when the material is too loose for compressing same and to separate said bars when the density is excessive to maintain the density uniformly periodically during the movement of the material.

ARTHUR A. ROTHROCK.

REFERENCES CITED

The following references are of record in the file of this patent:

UNITED STATES PATENTS

| Number | Name | Date |
| --- | --- | --- |
| 1,076,288 | Jackson | Oct. 21, 1913 |
| 1,205,980 | Dudley | Nov. 28, 1916 |
| 2,389,510 | Hitchcock | Nov. 20, 1945 |
| 2,396,720 | Nolt | Mar. 19, 1946 |
| 2,478,012 | Raney | Aug. 2, 1949 |
| 2,548,559 | Ronning | Apr. 10, 1951 |